H. M. LOFTON.
METER BOX.
APPLICATION FILED NOV. 2, 1910.
1,169,976.
Patented Feb. 1, 1916.
2 SHEETS—SHEET 1.
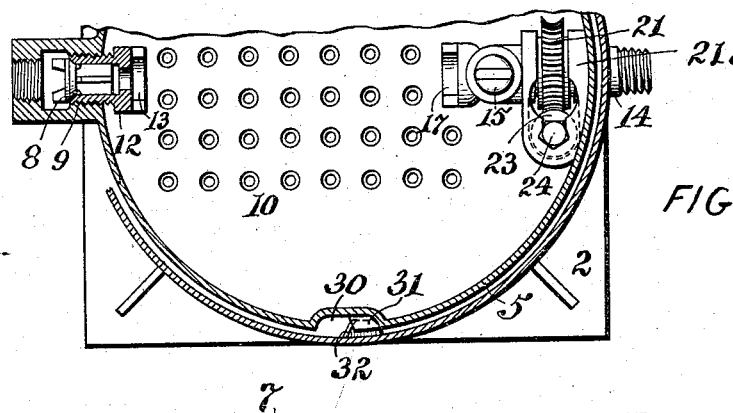
FIG. 2
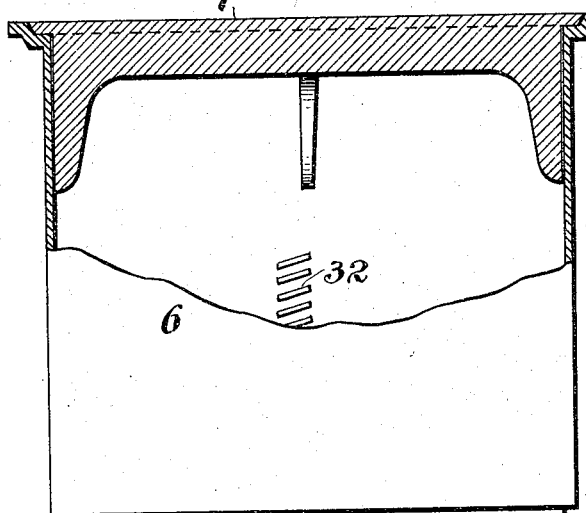
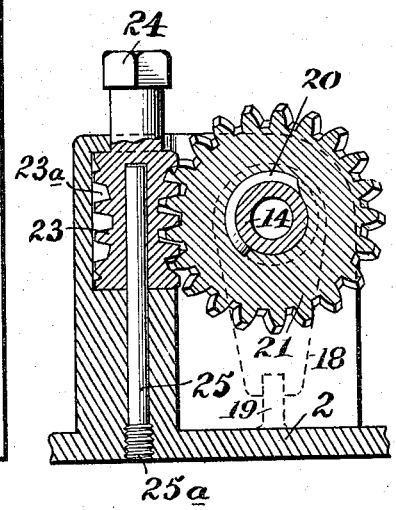
FIG. 4
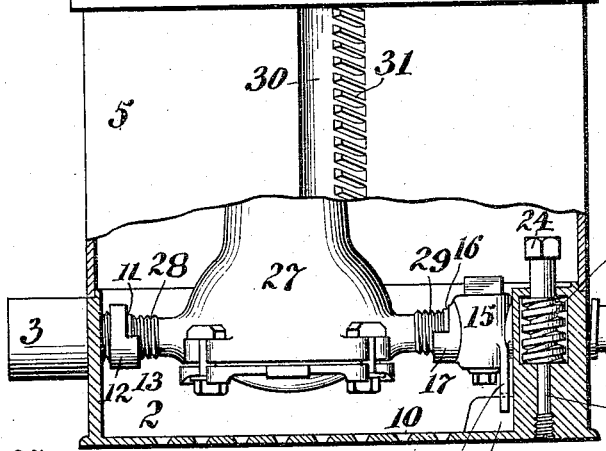
FIG. 1

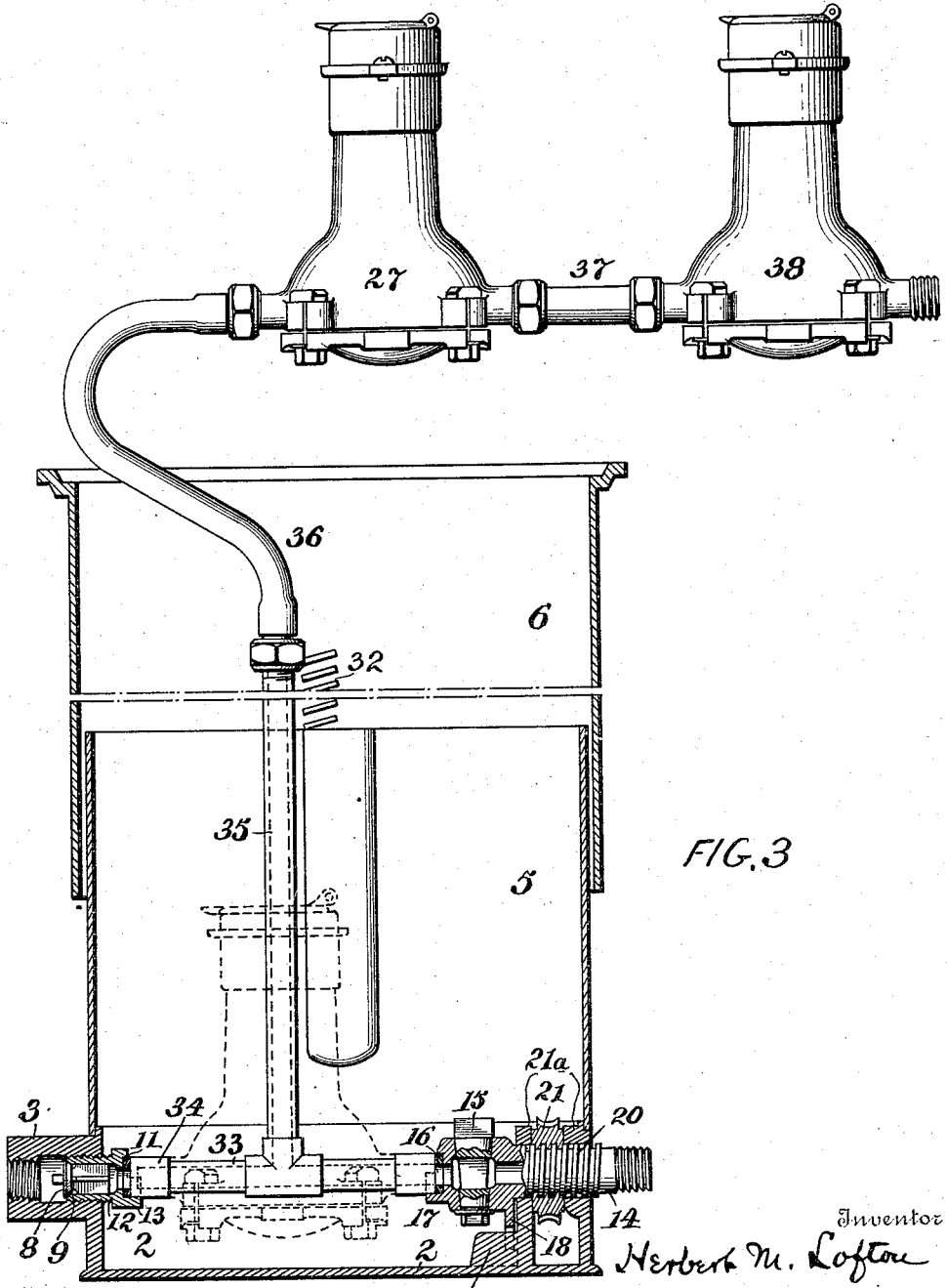

UNITED STATES PATENT OFFICE.

HERBERT M. LOFTON, OF CHATTANOOGA, TENNESSEE.

METER-BOX.

1,169,976.  Specification of Letters Patent.  Patented Feb. 1, 1916.

Application filed November 2, 1910. Serial No. 590,274.

*To all whom it may concern:*

Be it known that I, HERBERT M. LOFTON, a citizen of the United States, and a resident of the city of Chattanooga, county of Hamilton, State of Tennessee, have invented an Improvement in Meter-Boxes, of which the following is a specification.

My invention has reference to meter boxes and consists of certain improvements which are fully set forth in the following specification and shown in the accompanying drawings which form a part hereof.

My improved meter box is adapted to be employed in connection with a water pipe leading from the street to a building and adapted to contain the meter, held in position in a detachable manner, so as to be easily removable from the box when desired for any cause.

The object of my invention is also to so provide the meter box with means for ready connection with the meter or with test piping by which the meter to be inserted in the box may be tested in connection with a test meter to determine its reliability as to proper registration of the water passing through it.

The object of my invention is also to provide the meter box with means for readily adjusting the depth thereof to suit the distance of the pipe below the surface of the street; and also to provide adequate control of the water on the inlet side of the meter box as well as upon the discharge side, to prevent water flowing into the box when the meter is removed for any cause.

My invention consists in certain features of construction adapted to secure the above described objects and said features, together with details of construction, are fully described hereinafter and more particularly defined in the claims.

Referring to the drawings: Figure 1 is an elevation, with parts in section showing my improved meter box with the meter attached; Fig. 2 is a sectional plan view of the same with the meter removed and a part of the box broken away; Fig. 3 is a sectional elevation of my improved meter box with the meter lifted out and coupled in connection with a test meter and a pipe connection attached in the meter box; and Fig. 4 is a cross section of the adjusting devices for clamping the meter in position.

2 is the base of the meter box and is provided with an outlet 3 on one side and an inlet upon the other side, the latter being adjustable. The bottom of the base may be perforated, as at 10, for permitting drainage of any water which may collect therein. The outlet 3 is adapted for connection with the supply pipe leading from the meter box to the building or place of use of the water, and this outlet is provided with a valve body 12 having a seat 9 and a check valve 8 seating upon the seat 9 so as to prevent back flow of the water into the meter box. The other end of the valve body is provided with an aperture and packing washer 11, and also with a semicircular support 13 upon which the discharge nozzle of the meter normally rests when clamped in position, as clearly indicated in Fig. 1.

The inlet to the meter box consists of a tubular part 14 guided through lateral apertures in the meter box base and provided with a screw thread 20, upon which is screwed the worm wheel 21. The worm wheel 21 is held between two abutments 21ª in the meter box and is rotated by a worm 23 having a polygonal head 24 which may be turned by a suitable key placed down into the meter box. When the worm is turned, the worm wheel rotates and feeds the inlet tube 14 longitudinally. This tubular inlet is provided with a downwardly projected slotted arm 18 which fits over a guide rib 19 on the base and which prevents the tubular inlet from rotating during its reciprocal movement. The inner end of the tubular inlet is provided with an annular packing 16 and a semicircular bearing 17, similar in construction to the corresponding parts 11 and 13 on the outlet side, said parts 16 and 17 being directed oppositely to the parts 11 and 13 so as to simultaneously engage the inlet 29 of the meter 27 at the same time that the outlet 28 of the meter engages with the packing 11 and support 13. By adjusting the worm 23, the meter may be clamped in position or released as desired, without the necessity of getting down into the meter box for making pipe connections or disconnections. The tubular inlet 14 is further provided with a shut-off valve 15, which may be turned to close the inlet before disconnecting the meter, so that no water may be permitted to flow into the meter box when the meter is removed.

As the distance of the service pipe below the surface of the street is to a greater or less extent, it is important to provide means for adjusting the height of the meter box;

and to secure this result, as well as to provide the proper covering over the meter proper and its connections, I have employed the following construction. Detachably fitted upon the base 2 is a tubular part 5 and fitting over the upper end of this tubular part 5 is an upper tubular part 6, said parts 5 and 6 forming together a telescopic joint of loose character and being relatively adjustable so as to vary the total height of the box formed by the said tubular parts 5 and 6. The upper end of the part 6 should be on the level of the street and may be covered with a removable lid 7, having downwardly extending wing portions by which it is prevented from being easily displaced. The means for adjustably supporting the part 6 upon the part 5 of the meter box consists of the parts 30, 31 and 32, of which 30 is a vertically arranged recess upon the lower tubular part 5, and containing, for approximately half its width, a series of oblique parallel teeth 31, the obliquity of which is such that the slots between the teeth are closed at their lower ends, as will be readily understood from examining Fig. 1. 32 are teeth extending inwardly upon the upper tubular part 6 and have an incline corresponding to the incline of the teeth 31, so that they may engage the slots between the teeth 31, as indicated in Fig. 2, for the purpose of sustaining the part 6 upon the part 5. These teeth 32 have a width approximately equal to the width of the recess 30 not occupied by the teeth 31, so that to adjust the part 6 upon the part 5 it is only necessary to rotate it sufficiently to bring the teeth 32 into the free space of the recess 30 and then raise or lower the tubular part 6 to the desired height; after which, the said part 6 is rotated to bring the teeth 32 into engagement with the slots of the teeth 31 and upon which latter they rest. By means of the inclination of the teeth, the engagement of the parts 31 and 32 produce in effect a locked joint which will not disengage itself, as would be liable to happen if the teeth 31 and 32 were horizontal.

It is evident that while I prefer to employ a plurality of teeth 32 for simultaneous engagement with the slots of the teeth 31, all but the lower teeth 32 may be omitted and the same adjustment would be secured or I may dispense with all but the upper of the teeth 31. I prefer, however, to employ a plurality of teeth 31 and 32 as affording a number of points of support and less liability of breakage. While I have described one such of the parts 30, 31 and 32 with respect to one side only of the box, it is to be understood that a plurality of such parts may be employed if so desired. In Fig. 1, the figures 30 and 31 correspond to the near side, whereas in Figs. 1 and 3, the numerals 32 relate to the engaging parts on the far or distant side.

While it is immaterial to my invention how the worm gear 23 is journaled in position upon the base, nevertheless for economical reasons, I prefer to construct it as illustrated in Fig. 4. The worm 23 loosely fits into a recess 23ª and is provided with a central bearing, and said worm is journaled by means of said bearing upon a stud 25, which is inserted vertically through the bottom of the base and projects upwardly into the bearing hole in the worm, the lower end of the said stud 25 being screw threaded to maintain its position in the base. This stud, therefore, not only acts as a journal for the worm 23, but also prevents the said worm from becoming displaced when, from any reason, the worm wheel is removed.

In the operation of my improved meter box, the meter 27 may be lowered in position so that its inlet 29 and outlet 28 respectively rest upon the curved bearings 17 and 13; after which, the worm 23 is rotated and the inlet part 14 moved inwardly so as to clamp the said inlet and outlet of the meter respectively upon the packing washers 16 and 11, thereby putting the meter into direct communication with the inlet and outlet parts of the meter box and without the necessity of any screwed joints.

In connection with my improved meter box, I provide means for testing the meter from time to time, and said means when connected for testing, is as shown in Fig. 3. This testing device comprises an angle pipe structure, the horizontal pipe 33 of which is closed at one end 34 and open at the other end and in length is approximately equal to the distance between the inlet and outlet ports of the meter, the open end of this being adjusted in communication with the packing ring 16 of the inlet to the meter box and the closed end abutting against the packing of the outlet of the meter box. By rotating the worm, said horizontal pipe may be clamped in position in place of the meter (Fig. 3) and is adapted to receive the water from the street main by opening the valve 15. The pipe 33 is provided with an upright tubular branch 35 which is connected with a piece of hose 36 extending above the top of the open meter box. The free end of the hose 36 is joined to the inlet side of the meter 27, which for testing has been lifted to the street where it can be observed. The outlet side of the meter is connected by a coupling 37 with the inlet side of a test meter 38. The water is permitted to flow through the pipe 33, pipe 35, hose 36 and thence through the meters 27 and 38 successively. If the meter 27 is accurate, it should register exactly the same amount of water as is registered by the test meter 38. In this manner, the meter of the meter box may be temporarily removed and tested from time to time and the particular mechanism within the meter box which is employed to clamp the meter in place may also be employed to clamp the testing apparatus in place, as above described.

I have shown my invention in the form which I have found to be excellently adapted to the commercial requirements, but I do not limit myself to the details, as these may be modified without departing from the spirit of the invention.

In this application, I do not make claim to the devices for holding the meter in position or for testing the same, as said structures will form subject matter of a divisional application issued as Letters Patent No. 1,133,386 and dated March 30, 1915. Such features as are shown and not claimed, are reserved for a separate application.

Having now described my invention what I claim as new and desire to secure by Letters Patent is:—

1. In a meter box, a base part having an upwardly extending lower tubular body part of cylindrical cross section, combined with an upper tubular body part, one of said body parts having its face formed with a vertical recess of substantially uniform depth and filled to approximately one-half of its width with a plurality of inclined teeth and intervening inclined spaces also of uniform depth, said spaces abruptly closed at one end, and the other of said body parts having inclined teeth of approximately the width of the intervening spaces and detachably arranged therein and engaging the teeth of the recess, whereby the upper tubular body part may be adjusted upon the lower tubular body part and the weight of the former will maintain the teeth in locked engagement.

2. In a meter box, a base part having an upwardly extending lower tubular body part of cylindrical cross section, combined with an upper tubular body part also of cylindrical cross section and sliding upon the lower part, one of said parts having a narrow vertical recess facing the other part, said tubular parts forming a snugly fitting adjustable telescopic joint and respectively having inwardly and outwardly directed inclined engaging teeth, the teeth on one part being arranged in the recessed portion thereof and partly filling the width of the same and the spaces between them closed at one end by the side wall of the groove, and in which the inclined teeth of one part engage the inclined teeth of the other part and fitting the inclined grooves and abutting against the end wall thereof.

3. In a meter box, a base part having an upwardly extending lower tubular body part of cylindrical cross section provided with a vertical grooved portion, combined with an upper tubular body part also of cylindrical cross section and fitting closely over the grooved portion, said tubular parts forming a relatively close fitting telescopic joint and having respectively inwardly and outwardly directed narrow teeth the teeth of the lower tubular part being of a width to partly fill the width of the groove and wholly shielded therein, and the teeth of the upper tubular part being of a width to slide in the toothless portion of the groove and be brought into engagement with the first mentioned teeth by rotating the upper tubular body part relatively to the lower tubular body part.

4. In a meter box, a base part having an upwardly extending lower tubular body part, combined with an upper tubular body part, said tubular parts forming a snugly fitting telescopic joint and having respectively narrow inwardly and outwardly directed teeth by which they are adjustably secured together by the inwardly directed teeth upon one of the parts engaging the outwardly directed teeth upon the other part and said lower tubular body part having a vertical grooved portion in which the teeth are arranged and for a portion only of the width.

In testimony of which invention, I hereunto set my hand.

HERBERT M. LOFTON.

Witnesses:
P. J. CUMMINS,
W. J. DODGE.

Copies of this patent may be obtained for five cents each, by addressing the "Commissioner of Patents, Washington, D. C."